Jan. 3, 1933.  S. B. SCHNITTER  1,892,906.
FLOW CHECK
Filed July 10, 1930
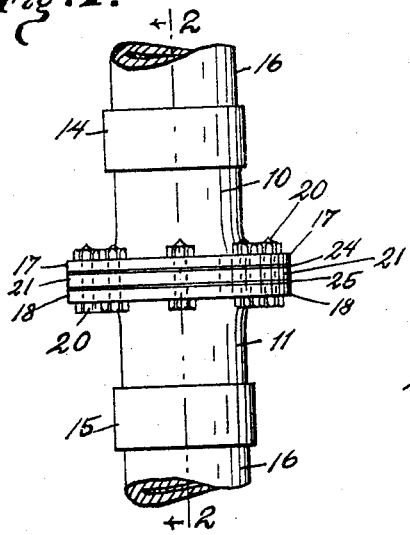
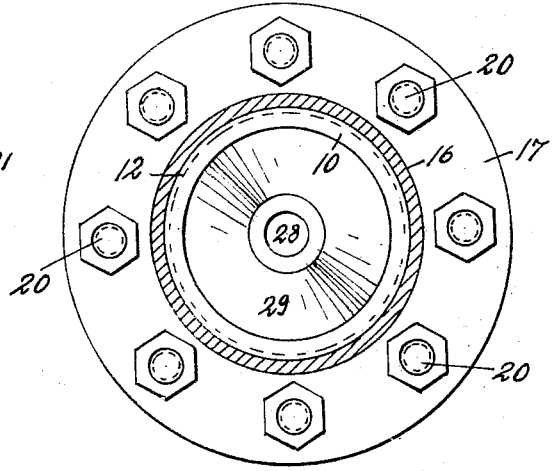
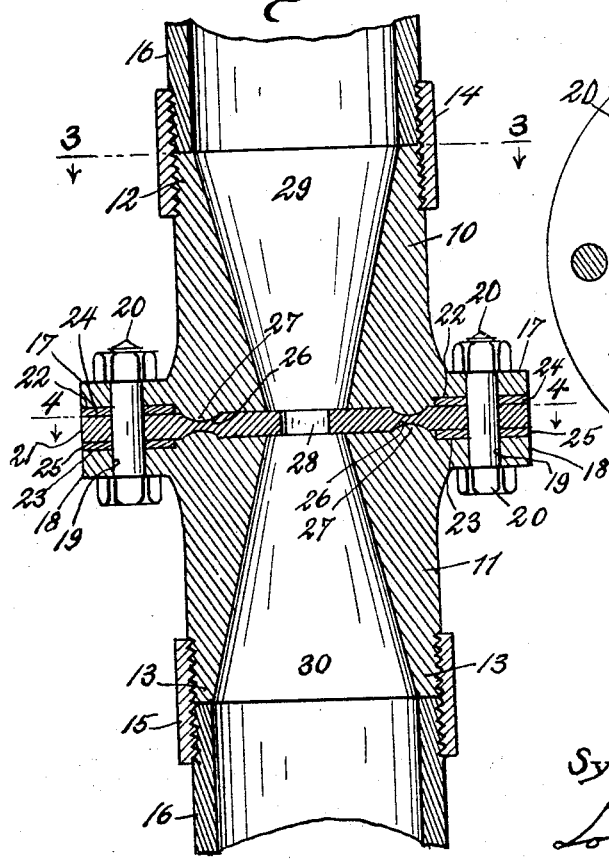
Inventor.
Sylvester B. Schnitter.
by
Lockwood & Lockwood,
His Attorneys.

Patented Jan. 3, 1933

1,892,906

UNITED STATES PATENT OFFICE

SYLVESTER B. SCHNITTER, OF MARACAIBO, VENEZUELA

FLOW CHECK

Application filed July 10, 1930. Serial No. 466,915.

This invention relates to means for reducing the flow of fluids through pipes and the principal object is to provide a flow check that is especially adapted for use in flow pipes of wells in which the fluid is under high pressure such as is liable to burst the pipes if too abruptly interrupted in its natural flow. To that end I provide a flow check having a gradually reduced diameter from its inlet end toward its cross center with the diameter correspondingly expanded from its cross center to its discharge end so that the flow of the fluid is gradually checked as it approaches the center of the flow check beyond which it is permitted to gradually expand in volume whereby a balance of pressure is maintained on opposite sides of its cross center.

Another object of the invention is to provide a flow check having a baffle plate arranged at its cross center that can be removed and replaced by another one having a larger or smaller flow passage without disconnecting the flow check from the flow pipe. To that end I provide a flow check formed of two major parts that can be fixed relatively permanent to the flow pipe with the abutting ends of the parts provided with registering flanges that can be bolted together with a baffle plate between them that can be removed and replaced by simply disconnecting the bolts.

Another object of the invention is to provide a flow check of simple construction for controlling the flow of fluid under high pressure which includes means for gradually reducing the flow diameter of the flow volume of fluid, for a predetermined distance, and then permitting the flow volume to expand in the same ratio in which it was reduced so as to maintain a balance of flow pressure on opposite sides of a baffle plate through which the fluid is passed after reduction in flow diameter.

Features of invention are shown in the construction, combination and arrangement of the parts whereby a flow check is provided that is easy to construct, assemble and install, which comprises a relatively few parts that are very strong and durable, and which in use is effective to accomplish its purpose.

A feature of invention is shown in the construction and arrangement of the baffle plate which is arranged to take substantially all of the wear off of the pipe fittings of the flow check.

Other objects, advantages and features of invention may appear from the accompanying drawing, the subjoined detailed description and the appended claim.

The accompanying drawing illustrates the invention, in which:

Figure 1 is a perspective view of a flow check secured to a flow pipe, the latter being broken away.

Fig. 2 is an enlarged central vertical section on line 2—2, Fig. 1, showing the flow check secured by threaded sleeves to a flow pipe showing the detailed construction of the flow check.

Fig. 3 is a cross section on the line 3—3, Fig. 2.

Fig. 4 is another cross section on line 4—4, Fig. 2, showing a plan view of the baffle plate.

The flow check includes the pipe fittings 10 and 11 that have threaded ends 12 and 13 so they can be secured by pipe couplings 14, 15 to adjacent ends of the flow pipe 16, the ends of the flow pipe being arranged to abut the threaded ends of the pipe fittings.

The other ends of the pipe fittings 10 and 11 are provided with annular flanges 17, 18 having registering holes 19 for the bolt 20 by which the flanged ends are secured together with a baffle plate 21 arranged between them.

Preferably the flanges 17 and 18 are provided with annular recesses 22, 23 for metallic gaskets 24, 25 that are arranged on opposite sides of marginal edge portion of said baffle plate and also if desired the baffle plate 21 can be provided with oppositely arranged annular grooves 26 arranged to receive the annular beads 27 that are integral with and extend slightly beyond the flanged ends of the pipe fitting. The purpose in providing the annular grooves 26 and beads 27 is to aid in a quick register of the parts when assembling them. That is, the baffle plate when seated between the fitting forms a turn-table on which one or the other of the fittings can be rotated to bring the holes through the flanges and gaskets into register.

The pipe fittings are provided with the flanged ends so the baffle plate 21 can be removed for replacing it with another one having either a smaller or larger opening 28 therethrough, and the exchange of baffle plates can be accomplished without detaching the pipe fittings 10 and 11 from the flow pipe. The cylindrical opening 28 is arranged in axial alignment with the flow pipe so that the fluid passes in a relatively straight course centrally through the baffle plate and flow check.

Each of the pipe fittings 10 and 11 is provided with passages 29, 30 that are tapered from the threaded ends with a gradually decreasing diameter toward their flange ends with their smallest diameters terminating flush with the flanged ends of the fittings, their largest diameters being substantially the same as the inner diameter of the flow pipe 16, and also the smaller diameters of these fittings are considerably larger than the cylindrical passage through the baffle plate.

The passages 29, 30 are tapered so that when the pipe fittings 10 and 11 are secured together and in use the diameter of the flow volume of the fluid will be gradually reduced as it approaches and contacts with the wall of the baffle plate, after which the diameter of the flow volume will be gradually increased in the same ratio as the reduction of the flow volume after it passes through the cylindrical passage through the baffle plate so that the pressure of the fluid on opposite sides of the baffle pipe is equal.

In use the flow check is secured in a flow pipe as shown with a baffle plate adapted to check a major portion of the fluid, and having a passage 28 therethrough that is the right size to give the desired flow of fluid, and when so used the flow check will reduce the flow without excessive strain on the flow pipe.

I claim as my invention:

A flow check including a pair of pipe fittings having threaded ends by which they can be connected by pipe couplings to adjacent ends of a flow pipe, annular flanges at the other ends of said fittings by which they can be detachably secured together, each of said fittings having a tapered passage therethrough that is gradually reduced in diameter from the threaded end to the flanged end, a baffle plate secured between said fittings, said plate having a relatively small cylindrical passage therethrough in alignment with the axis of said pipe, and gaskets arranged in annular recesses in said flanges on opposite sides of the marginal edge portion of said baffle plate for the purpose specified.

In witness whereof, I have hereunto affixed my signature.

SYLVESTER B. SCHNITTER.